United States Patent Office 3,320,277
Patented May 16, 1967

3,320,277
3-AMINO-3-HYDROXYMETHYLALKYNES
Minoo Dossabhoy Mehta, Wimbledon, and David Miller, Dorking, Surrey, England, assignors to Beecham Group Limited, Brentford, England, a British company
No Drawing. Filed Aug. 27, 1965, Ser. No. 483,330
Claims priority, application Great Britain, Sept. 3, 1964, 36,205/64
26 Claims. (Cl. 260—326.5)

This invention relates to acetylenic amines that have hypotensive activity.

The present invention provides acetylenic amines of the formula:

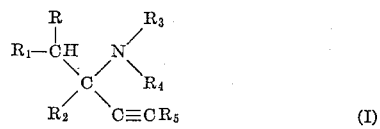

(I)

and non-toxic acid-addition and quaternary ammonium salts thereof, wherein R is a hydrogen atom or an alkyl group containing 1–3 carbon atoms, $R_1$ is a hydroxy, alkoxy, acyloxy, carbamoyloxy, aryloxy or aralkoxy group or a halogen atom, $R_2$ is an alkyl, aryl or aralkyl group, and $R_3$ and $R_4$ are the same or different and are each a hydrogen atom, or an alkyl, hydroxy-alkyl or aralkyl group, or $R_3$ and $R_4$ together with the N atom to which they are attached form a 5- or 6-membered heterocyclic ring system, and $R_5$ is a hydrogen atom, an alkyl or aryl group or a cyclopentyl or cyclohexyl group.

Since the compounds of the present invention contain asymmetric centers, they can exist in several optically active forms, and the present invention extends to these optically active forms as well as to the corresponding racemic mixtures.

The invention also provides a process for preparing compounds of Formula I and acid-addition and quaternary ammonium salts thereof, which process comprises heating ammonia or an amine of the formula $R_3R_4NH$ either in presence of a metal with a chlorocarbinol of the formula:

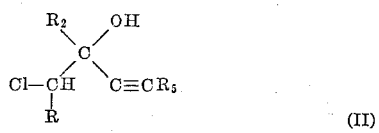

(II)

or with an epoxide of the formula:

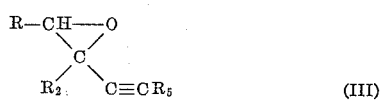

(III)

to give a product in which $R_1$ is a hydroxy group and, if desired, esterifying, etherifying or halogenating this group, and when $R_3$ and/or $R_4$ are hydrogen atoms, if desired alkylating, hydroxyalkylating or aralkylating, and when $R_3$ is a t-butyl group, if desired pyrolysing, and/or forming an acid-addition or quaternary ammonium salt thereof.

Preferably, the metals used in the reaction between the chlorocarbinol (II) and ammonia or an amine $R_3R_4NH$ are copper, silver, iron and nickel, and the reaction is effected by heating the reactants in an inert solvent. If necessary, the reaction is effected under increased pressure where very volatile reactants are involved.

Preferably, when an epoxide (III) is heated with $R_3R_4NH$ an acid-addition salt thereof is present. Suitably the reaction is effected in an inert solvent at 50° to 60° C.

Some of the epoxides (III) are also novel compounds, and are obtained by treating a chlorocarbinol (II) with an alkali metal hydroxide in an ether solvent.

The amines (I) may be recovered from the reaction mixtures or converted to acid-addition or quaternary ammonium salts and these recovered.

Products obtained by the process of the invention contain a hydroxy group (i.e. $R_1$ is OH) and may be esterified, etherified and/or halogenated by the usual methods well known in the art.

Depending on the substituents present in the starting compounds, the products may be subjected to various modifying reactions. For example, in preparing a product in which $R_3=R_4=C_2H_5$, the yields are improved by using ethylamine in the initial reaction to give a product in which $R_3=C_2H_5$ and $R_4=H$, and then ethylating with ethyl iodide in presence of potassium carbonate, rather than by using diethylamine in the initial reaction. By this and similar well known procedures other amines may be obtained.

When $R_3$ in the product is t-butyl, this group may be removed by pyrolysis to give the compound in which $R_3=H$. It has been found in preparing the compounds of the invention in which $R_3=R_4=H$ by reaction with ammonia, that yields are sometimes low. The route through a t-butyl derivative may therefore provide such compounds in better yield.

The compounds of the present invention may be employed in admixture with suitable pharmaceutical carriers in various medicinal dosage unit forms.

The present invention therefore also includes a composition comprising a pharmaceutical carrier and a compound of Formula I.

The following examples illustrate the invention.

*Example 1.—3-ethylamino-3-hydroxymethylpent-1-yne*

3-chloromethylpent-1-yne-3-ol (20 g.), ethylamine (48 ml.), light petroleum B.P. 60–80° C. (30 ml.) and 50-mesh iron wire gauze (105 g.; previously etched in dilute sulphuric acid) were heated at 60° C. for 24 hours in a borosilicate-glass pressure vessel. Ether and water were added to the reaction mixture and the ethereal and aqueous layers were separated. The aqueous layer after the addition of 40% aqueous sodium hydroxide solution (20 ml.) was extracted with ether and the combined ethereal solutions were dried (MgSO$_4$). Removal of solvent left a brown solid (20.19 g.), M.P. 64–66° C., which, with ethereal hydrogen chloride, gave 3-ethylamino-3-hydroxymethylpent-1-yne hydrochloride (18.5 g., 69%), M.P. 183° C., as colorless crystals from ethanol-acetone. (Found: C, 53.8; H, 9.1; Cl, 19.9; N, 7.85. $C_8H_{16}ClNO$ requires C, 54.1; H, 9.0; Cl, 20.0; N, 7.9%.)

The free base when liberated from the pure hydrochloride had M.P. 68–68.5° C. (Found: C, 67.8; H, 11.0; N, 9.6. $C_8H_{15}NO$ requires: C, 68.1; H, 10.6; N, 9.9%.)

*Examples 2–17*

By the method described in Example 1, reaction of a suitable chlorocarbinol with an appropriate amine $R_3R_4NH$ in presence of iron gave compounds of the formula $CH_2OH \cdot CR_2(NR_3R_4) \cdot C:CH$ as shown in Table I; in some instances when an amine $R_3NH_2$ was used, the product was N-alkylated.

The 4-chloro-3-phenylbut-1-yn-3-ol required for Examples 11 to 15 was prepared from ethynylmagnesium bromide and α-chloroacetophenone in known manner. The yields in Example 15 and in parenthesis in Example 8 were obtained with a copper catalyst. The free bases in Examples 5 and 8 were oils having $n_D^{20}$ 1.4600 and 1.4642, respectively.

| Ex. No. | $R_2$ | $R_3$ | $R_4$ | Salt | M.p., °C. | Yield percent | Analysis |
|---|---|---|---|---|---|---|---|
| 2 | Et | Me | H | HCl | 180 | 52 | $C_7H_{14}ClNO$<br>Found: C=51.2; H=8.2; Cl=21.7; N=8.7%.<br>Required: C=51.4; H=8.6; Cl=21.7; N=8.6%. |
|  | Et | Me | H |  | 48–49 |  | $C_7H_{13}NO$<br>Found: C=66.35; H=10.3; N=10.8%.<br>Required: C=66.1; H=10.2; N=11.0%. |
| 3 | Et | nPr | H | HCl | 176–176.5 | 24 | $C_9H_{18}ClNO$<br>Found: C=56.4; H=9.6; Cl=18.4; N=7.4%.<br>Required: C=56.4; H=9.4; Cl=18.5; N=7.3%. |
|  | Et | nPr | H |  | 60–60.5 |  | $C_9H_{17}NO$<br>Found: C=69.9; H=10.9; N=9.1%.<br>Required: C=69.7; H=11.0; N=9.0%. |
| 4 | Et | iPr | H | HCl | 193–194 | 47 | $C_9H_{18}ClNO$<br>Found: C=56.7; H=9.65; Cl=18.6; N=7.0%.<br>Required: C=56.4; H=9.4; Cl=18.5; N=7.3%. |
|  | Et | iPr | H |  | 50.5–51 |  | $C_9H_{17}NO$<br>Found: C=69.4; H=11.2; N=8.9%.<br>Required: C=69.7; H=11.0; N=9.0%. |
| 5 | Et | tBu | H | HCl | 184–185d. | 34 | $C_{10}H_{20}ClNO$<br>Found: C=58.4; H=9.7; Cl=17.5; N=6.95%.<br>Required: C=58.4; H=9.7; Cl=17.3; N=6.8%. |
|  | Et | tBu | H |  | Oil |  | $C_{10}H_{19}NO$<br>Found: C=70.6; H=11.3; N=7.9%.<br>Required: C=71.0; H=11.25; N=8.3%. |
| 6 | Et | Me | Me | HCl | 139–139.5 | 20 | $C_8H_{16}ClNO$<br>Found: C=54.4; H=9.1; Cl=20.1; N=8.2%.<br>Required: C=54.1; H=9.0; Cl=20.0; N=7.9%. |
|  | Et | Me | Me |  | 77–77.5 |  | $C_8H_{15}NO$<br>Found: C=67.9; H=10.7; N=10.0%.<br>Required: C=68.1; H=10.6; N=9.9%. |
| 7 | Et | Et | Et | HCl | 128–129 | 5 | $C_{10}H_{20}ClNO$<br>Found: C=58.3; H=9.7; Cl=17.3; N=6.6%.<br>Required: C=58.4; H=9.7; Cl=17.3; N=6.8%. |
|  | Et | Et | Et |  | Oil |  | $C_{10}H_{19}NO$<br>Found: C=70.5; H=11.5; N=8.1%.<br>Required: C=71.0; H=11.25; N=8.3%. |
| 8 | Me | Et | H | HCl | 146.5–148 | 33(51) | $C_7H_{14}ClNO$<br>Found: C=51.1; H=8.6; .Cl=21.6; N=8.8%.<br>Required: C=51.4; H=8.6; Cl=21.7; N=8.6%. |
|  | Me | Et | H |  | 72.5–73 |  | $C_7H_{13}NO$<br>Found: C=65.9; H=10.5; N=10.95%.<br>Required: C=66.2; H=10.2; N=11.0%. |
| 9 | Me | nBu | H | HCl | 145.5–146.5 | 40 | $C_9H_{18}ClNO$<br>Found: C=56.5; H=9.5; Cl=18.6; N=7.0%.<br>Required: C=56.4; H=9.4; Cl=18.5; N=7.3%. |
|  | Me | nBu | H |  | 55.5–56.5 |  | $C_9H_{17}NO$<br>Found: C=69.5; H=11.3; N=9.1%.<br>Required: C=69.7; H=11.0; N=9.0%. |
| 10 | Me | tBu | H | HCl | 191–192d. | 33 | $C_9H_{18}ClNO$<br>Found: C=56.5; H=9.2; Cl=18.4; N=7.0%.<br>Required: C=56.4; H=9.4; Cl=18.5; N=7.3%. |
|  | Me | tBu | H |  | 31–32.5 |  | $C_9H_{17}NO$<br>Found: C=69.65; H=11.1; N=9.2%.<br>Required: C=69.7; H=11.0; N=9.0%. |
| 11 | Ph | Et | H | HCl | 168–169 |  | $C_{12}H_{16}ClNO$<br>Found: C=63.75; H=7.1; Cl=15.5; N=6.35%.<br>Required: C=63.9; H=7.1; Cl=15.7; N=6.2%. |
|  | Ph | Et | H |  | 65–65.5 | 35 | $C_{12}H_{15}NO$<br>Found: C=75.8; H=8.2; N=7.2%.<br>Required: C=76.2; H=7.9; N=7.4%. |
| 12 | Ph | nPr | H |  | 54 | 50 | $C_{13}H_{17}NO$<br>Found: C=76.5; H=8.5; N=6.8%.<br>Required: C=76.8; H=8.4; N=6.9%. |
| 13 | Ph | nBu | H |  | 42–43 | 45 | $C_{14}H_{19}NO$<br>Found: C=77.8; H=8.8; N=6.2%.<br>Required: C=77.4; H=8.75; N=6.45%. |
| 14 | Ph | iPr | H | HCl | 170–171 | 39 | $C_{13}H_{18}ClNO$<br>Found: C=65.1; H=7.7; Cl=14.4; N=6.1%.<br>Required: C=65.1; H=7.5; Cl=14.8; N=5.9%. |
| 15 | Ph | tBu | H | HCl | 192–193 | 26 | $C_{14}H_{20}ClNO$<br>Found: C=66.0; H=8.0; Cl=14.2; N=5.5%.<br>Required: C=66.3; H=7.9; Cl=14.0; N=5.5%. |
| 16 | Et | tBu | Me | HCl | 125–125.5 |  | $C_{11}H_{22}ClNO$<br>Found: C=60.3; H=9.7; Cl=16.25; N=6.4%.<br>Required: C=60.1; H=10.0; Cl=16.2; N=6.4%. |
| 17 | Me | tBu | Me | HCl | 116–117 |  | $C_{10}H_{20}ClNO$<br>Found: C=58.1; H=9.7; Cl=16.9; N=6.7%.<br>Required: C=58.4; H=9.7; Cl=17.3; N=6.8%. |

*Example 18.—3-pyrrolidino-3-hydroxymethylbut-1-yne hydrochloride.*

3-chloromethylbut-1-yne-3-ol (8.9 g.), pyrrolidine (31.3 ml.), light petroleum (B.P. 60–80° C.) (35 ml.) and thin copper sheet (40 g.; previously etched with dilute nitric acid) were heated at 60° C. for 24 hours in a borosilicate-glass pressure vessel. After working up as described in Example 1, removal of solvent left a dark brown solid which, after 2 sublimations, was converted with ethereal hydrogen chloride to an almost colorless hydrochloride. Crystallisation from ethanol-acetone gave 3-pyrrolidino - 3 - hydroxymethylbut-1-yne hydrochloride (8.79 g., 62%), M.P. 163–164° C. (Found: C, 56.95; H, 8.4; Cl, 18.7; N, 7.5. $C_9H_{16}ClNO$ requires: C, 57.0; H, 8.4; Cl, 18.7; N, 7.4%.)

The free base when liberated from the pure hydrochloride had M.P. 91.5–92.5° C. (Found: C, 70.8; H, 10.0; N, 9.3. $C_9H_{15}NO$ requires: C, 70.6; H, 9.8; N, 9.2%.)

Example 19.—3-amino-3-hydroxymethylbut-1-yne

Reaction of the chloro-carbinol (II; R=H, $R_2$=Me, $R_5$=H) with ammonia in the presence of an iron catalyst gave only a poor yield of the primary amine. This compound was obtained in better yield by the following procedure.

3-t-butylamino - 3 - hydroxymethylbut-1-yne toluene-p-sulphonate (3.21 g.), M.P. 138–139° C., was heated under vacuum in an oil bath at 180–190° C. for 45 minutes, by which time evolution of gas had ceased. The dark residue was dissolved in water (30 ml.) and the solution was made strongly basic by the addition of 40% aqueous sodium hydroxide solution (10 ml.). After saturation with sodium chloride, the solution was continuously extracted with ether for 24 hours to give, after drying ($MgSO_4$) and evaporation of the ether, an oil (0.7 g.). Treatment with ethereal hydrogen chloride gave 3-amino-3-hydroxymethylbut-1-yne hydrochloride (0.73 g., 58%), M.P. 144–145° C., which crystallised from ethanol/acetone/light petroleum (B.P. 60–80° C.) as colorless plates M.P. 145–146° C.

Example 20.—3-methyl-amino-3-hydroxymethylpent-1-yne 3-t-butylmethylamino-3 - hydroxymethylpent-1-yne hydrochloride (0.37 g.) was heated under nitrogen at 140–180° C. for 30 minutes, by which time evolution of gas had ceased. On cooling, the residue solidified and was broken up under ether and filtered off. Crystallisation from ethanol/acetone gave 3-methylamino-3-hydroxymethylpent-1-yne hydrochloride (0.22 g., 80%), M.P. 179–179.5° C., as colorless needles.

Example 21.—3-diethylamino-3-hydroxymethylpent-1-yne 3-ethylamino-3 - hydroxymethylpent-1-yne (11.76 g.), ethyl iodide (40 ml.) and anhydrous potassium carbonate (11.76 g.) were refluxed with stirring for 48 hours. After cooling, the reaction mixture was diluted with ether and the inorganic salts filtered off. The filtrate was washed with sodium thiosulphate solution, dilute aqueous sodium hydroxide, water, and was finally dried ($MgSO_4$). Removal of solvent left a brown oil which, with ethereal hydrogen chloride gave a gummy hydrochloride. Treatment of this material with acetone gave 3-diethylamino-3-hydroxymethylpent-1-yne hydrochloride (15.44 g., 90%), as an almost colorless solid M.P. 128–129° C. Crystallisation from chloroform/acetone gave colorless prisms M.P. 128.5–129° C.

The free base derived from this hydrochloride on treatment with methyl iodide gave the methiodide (77%), M.P. 125° C. (decomp.), as colorless prisms ex. acetone. (Found: C, 42.5; H, 7.2; I⁻, 40.5; N, 4.5. $C_{11}H_{22}NIO$ requires: C, 42.4; H, 7.1; I⁻, 40.8; N, 4.5%.)

Example 22

3-diethylamino-3-hydroxymethylbut-1-yne was prepared from 3-ethylamino-3-hydroxymethylbut-1-yne as described in Example 21, and isolated as the di-p-toluoyl-D-(—)-tartrate (72%), M.P. 158–159° C. (decomp.), as colorless crystals ex. acetone/light petroleum (B.P. 60–80° C.). (Found: C, 64.6; H, 6.6; N, 2.5. $C_{29}H_{35}NO_9$ requires: C, 64.4; H, 6.5; N, 2.6%.)

Example 23.—3-ethyl(prop-2-ynyl)amino-3-hydroxymethylpent-1-yne

Alkylation of 3-ethylamino-3-hydroxymethylpent-1-yne (1.4 g.) with propargyl bromide (5.95 g.) in butan-2-one (5 ml.) containing anhydrous potassium carbonate (1.4 g.) gave 3-ethyl(prop-2-ynyl)amino - 3 - hydroxymethylpent-1-yne isolated as its hydrochloride (29%), M.P. 190–191° C. (decomp.) from ethanol/acetone. (Found: C, 61.05; H, 8.0; Cl⁻, 16.5; N, 6.6. $C_{11}H_{18}ClNO$ requires: C, 61.25; H, 8.35; Cl⁻, 16.5; N, 6.5%.)

Example 24

3-benzyl(methyl)amino - 3 - hydroxymethylpent-1-yne was prepared as described in Example 23 but using acetone as a co-solvent. It was isolated as the free base (26%), M.P. 33.5–34° C., by crystallisation at —20° C. from light petroleum (B.P. 40–60° C.), after prior distillation (B.P. 93° C./0.1 mm.) (Found: C, 776; H, 9.2; N, 6.4. $C_{14}H_{19}NO$ requires: C, 77.4; H, 8.8; N, 6.45%.)

Example 25.—3-methyl(i-propyl)amino-3-hydroxymethylpent-1-yne 3-i-propylamino-3-hydroxymethylpent-1-yne (1.55 g.) was allowed to react with methyl iodide (1.42 g.) in acetone (5 ml.) at 40° C. for 43 hours. Dilution with ether afforded a granular solid which crystallised from chloroform as colorless microcrystals (2.34 g.) M.P. 128–131° C. Because the hydroiodide liberated iodine on standing, it was converted to the hydrochloride via the free base. Crystallisation of this material from chloroform/light petroleum (B.P. 60–80° C.) gave 3-methyl(i-propyl)amino-3-hydroxymethylpent-1-yne hydrochloride (0.94 g., 49%), M.P. 185–186° C., as colorless prisms. (Found: C, 58.2; H, 9.7; Cl, 17.7; N, 6.6. $C_{10}H_{20}ClNO$ requires: C, 58.4; H, 9.7; Cl, 17.3; N, 6.8%.)

Example 26.—Carbamate of 3-diethylamino-3-hydroxymethylpent-1-yne 3-diethylamino-3-hydroxymethylpent-1-yne (4.95 g.) was stirred in methylene chloride (40 ml.) containing anhydrous potassium carbonate (5 g.), whilst phenyl chloroformate (5.5 g.) in methylene chloride (20 ml.) was added dropwise at room temperature. After stirring for 24 hours, the reaction mixture was diluted with ether and the inorganic salts filtered off. The filtrate was added dropwise to stirred liquid ammonia (100 ml.), and the reaction mixture stirred overnight. Excess ammonia was allowed to evaporate and the residual ether solution was washed with 10% aqueous sodium hydroxide solution (2×10 ml.) and dried ($MgSO_4$). Removal of solvent in vacuo left a viscous oil which solidified on trituration with light petroleum (B.P. 60–80° C.) Crystallisation from light petroleum (B.P. 60–80° C.) gave the desired carbamate (3.53 g., 56%), M.P. 68–68.5° C., as colorless feathery needles. (Found: C, 62.5; H, 9.8; N, 13.3. $C_{11}H_{20}N_2O_2$ requires: C, 62.3; H, 9.4; N, 13.2%.)

Treatment of the carbamate with ethereal hydrogen chloride gave the corresponding hydrochloride M.P. 194.5° C. (decomp.), as colorless crystals ex. ethanol. (Found: C, 53.35; H, 8.4; Cl⁻, 14.2; N, 11.3. $C_{11}H_{21}ClN_2O_2$ requires: C, 53.1; H, 8.45; Cl⁻, 14.3; N, 11.3%.)

With methyl iodide, the corresponding methiodide, M.P. 150° (decomp.), was obtained as colorless plates ex. ethanol. (Found: C, 40.85; H, 6.7; I⁻, 36.1; N, 7.9. $C_{12}H_{23}IN_2O_2$ requires: C, 40.7; H, 6.5; I⁻, 35.9; N, 7.9%.)

Example 27.—1,1-diphenyl-1-methoxyacetate of 3-diethylamino-3-hydroxymethylpent-1-yne 3-diethylamino-3-hydroxymethylpent-1-yne (2.54 g.) and methyl 1,1-diphenyl-1-methoxyacetate (10.24 g.) were refluxed in heptane (100 ml.) whilst a solution of sodium methoxide in methanol (from 0.046 g. sodium and 3 ml. methanol was added dropwise. Methanol and heptane were slowly distilled from the reaction mixture whilst the volume was maintained by the addition of heptane. After 3 hours, the reaction mixture was cooled, diluted with ether, the organic solutions washed with water, and finally extracted with 5 N hydrochloric acid. Basification of the acid extracts with 40% aqueous sodium hydroxide solution liberated an oil which was extracted into ether and dried (MgSO$_4$). Treatment with ethereal hydrogen chloride gave a gum which on trituration with acetone gave a colorless solid (4.78 g.), M.P. 166° C. (decomp.). Crystallisation from ethanol afforded microcrystals of the desired basic ester hydrochloride (4.65 g. 72%), M.P. 167–168° C. (decomp.) (Found: C, 69.55; H, 7.6; Cl−, 8.3; N, 3.5. C$_{25}$H$_{32}$ClNO$_3$ requires: C, 69.8; H, 7.45; Cl−, 8.3; N, 3.3%.)

*Example 28.—3-isopropylamino-3-hydroxymethylpent-1-yne*

3-ethyl-3,4-epoxybut-1-yne (3.61 g.), isopropylamine (13.6 ml.), isopropylamine hydrochloride (3.63 g.), methanol (16.5 ml.), water (3.5 ml.) and iron filings (30 g., 60 mesh) were heated on a water bath at 50° C. for 48 hours with stirring. The iron filings were filtered off and washed thoroughly with ether and water, the washings being added to the filtrate. The organic layer was separated, the aqueous solution was washed with ether, and the combined ether solutions were dried (Na$_2$SO$_4$). Removal of solvent left an oil which was dissolved in dilute hydrochloric acid and some undissolved neutral material was extracted into ether (2×50 ml.). The aqueous solution was made alkaline with 45% potassium hydroxide solution, and the liberated base was extracted into ether (4×50 ml.) and dried (Na$_2$SO$_4$). Removal of solvent gave a pale brown solid, which was converted to its hydrochloride. Crystallisation from chloroform gave 3 - isopropylamino - 3 - hydroxymethylpent-1-yne hydrochloride.

*Example 29.—3-phenyl-3-n-propylamino-3-hydroxymethylprop-1-yne*

3,4-epoxy-3-phenylbut-1-yne (7.2 g.), n-propylamine (11.8 g., 16.4 ml.), n-propylamine hydrochloride (4.7 g.), methanol (60 ml.) and iron gauze (70 g.) were heated at 60° for 24 hours in a borosilicate-glass pressure vessel. After decantation, solvent was removed in vacuo, the residue dissolved in 5 N hydrochloric acid, and the aqueous solution extracted with ether. Basification of the aqueous solution gave an oil which was extracted into ether. Removal of solvent after drying gave a product which was distilled (6.5 g.), B.P. 95–100° C./0.08 mm. The distillate solidified and was crystallized from light petroleum (B.P. 60–80° C.) to give 3-phenyl-3-n-propylamino - 3 - hydroxymethylprop - 1 - yne as colorless needles (6.13 g., 60%), M.P. 53–54° C.

When n-propylamine hydrochloride was omitted from the reaction mixture, a lower yield (33%) of the aminoalcohol was obtained.

3,4-epoxy-3-phenylbut-1-yne (91%), B.P. 68–69°/2 mm., $n_D^{19}$ 1.5430, was prepared by stirring 4-chloro-3-phenylbut-1-yn-3-ol with powdered sodium hydroxide in ether for 6 hours. (Found: C, 83.1; H, 6.1. C$_{10}$H$_8$O requires C, 83.4; H, 5.6%).

We claim:
1. A compound selected from the group consisting of an acetylenic amine of the formula:

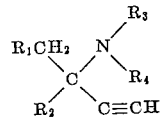

and non-toxic acid-addition salts thereof, wherein R$_1$ is hydroxy, R$_2$ is methyl, ethyl or phenyl, and R$_3$ and R$_4$ are alkyl of 1 to 4 carbon atoms, prop-2-ynyl and benzyl, or NR$_3$R$_4$ is pyrrolidino.
2. 3-ethylamino-3-hydroxymethylpent-1-yne.
3. 3-methylamino-3-hydroxymethylpent-1-yne.
4. 3-n-propylamino-3-hydroxymethylpent-1-yne.
5. 3-i-propylamino-3-hydroxymethylpent-1-yne.
6. 3-t-butylamino-3-hydroxymethylpent-1-yne.
7. 3-dimethylamino-3-hydroxymethylpent-1-yne.
8. 3-diethylamino-3-hydroxymethylpent-1-yne.
9. 3-ethylamino-3-hydroxymethylbut-1-yne.
10. 3-n-butylamino-3-hydroxymethylbut-1-yne.
11. 3-t-butylamino-3-hydroxymethylbut-1-yne.
12. 3-ethylamino - 3 - phenyl - 3 - hydroxymethylprop-1-yne.
13. 3-n-propylamino - 3 - phenyl-3-hydroxymethylprop-1-yne.
14. 3-n-butylamino - 3 - phenyl-3-hydroxymethylprop-1-yne.
15. 3-i-propylamino - 3 - phenyl-3-hydroxymethylprop-1-yne.
16. 3-t-butylamino - 3 - phenyl-3-hydroxymethylprop-1-yne.
17. 3-t-butyl(methyl)amino - 3 - hydroxymethylpent-1-yne.
18. 3 - t - butyl(methyl)amino - 3 - hydroxymethylbut-1-yne.
19. 3-pyrrolidino-3-hydroxymethylbut-1-yne.
20. 3-amino-3-hydroxymethylbut-1-yne.
21. 3-methylamino-3-hydroxymethylpent-1-yne.
22. 3-diethylamino-3-hydroxymethylpent-1-yne, a compound selected from the group consisting of the carbamate and 1,1-diphenyl-1-methoxyacetate thereof.
23. 3-diethylamino-3-hydroxymethylbut-1-yne.
24. 3 - ethyl(prop-2-ynyl)amino-3-hydroxymethylpent-1-yne.
25. 3 - benzyl(methyl)amino - 3 - hydroxymethylpent-1-yne.
26. 3-methyl(i-propyl)amino - 3 - hydroxymethylpent-1-yne.

References Cited by the Examiner
FOREIGN PATENTS
1,104,945    1/1961    Germany.

ALEX MAZEL, *Primary Examiner.*
NICHOLAS S. RIZZO, *Examiner.*
JOSEPH A. NARCAVAGE, *Assistant Examiner.*